United States Patent [19]
Lindner

[11] Patent Number: 6,027,830
[45] Date of Patent: Feb. 22, 2000

[54] BATTERY HAVING AN ELECTRODE MOUNTING CAGE AND METHOD FOR ITS MANUFACTURE

[75] Inventor: Hans Jürgen Lindner, Singapore, Singapore

[73] Assignee: Varta Batterie Aktiengesellschaft, Hannover, Germany

[21] Appl. No.: 08/987,442

[22] Filed: Dec. 9, 1997

[30] Foreign Application Priority Data

Dec. 13, 1996 [DE] Germany .......................... 196 51 978

[51] Int. Cl.$^7$ ...................................................... H01M 2/02
[52] U.S. Cl. .......................... 429/164; 429/208; 29/623.1
[58] Field of Search ................................... 429/208, 163, 429/164, 128, 186, 66, 96, 100, 121; 204/297 R; 29/623.1

[56] References Cited

U.S. PATENT DOCUMENTS

| | | | |
|---|---|---|---|
| 3,003,013 | 10/1961 | Duddy . | |
| 3,483,043 | 12/1969 | Steffens | 429/163 |
| 5,521,024 | 5/1996 | Sasaki et al. | 429/163 |

FOREIGN PATENT DOCUMENTS 1 596 306  4/1971  Germany .

*Primary Examiner*—Maria Nuzzolillo
*Assistant Examiner*—Susy Tsang
*Attorney, Agent, or Firm*—Schnader Harrison Segal & Lewis LLP; Gerard J. Weiser

[57] ABSTRACT

An electrode set (i.e., a separator between two electrodes) is placed within an electrically nonconductive mounting cage prior to sealing the mounting cage/electrode set assembly within a battery container having a cup-shaped lower part and a lid-shaped upper part. In a preferred embodiment, the mounting cage has a ring from which extend retaining arms with a projection at the end. The retaining arms are interconnected by curved-rib connections positioned near the separator. The mounting cage enables the electrode set to be accurately assembled before being sealed within the battery container. The ring of the mounting cage forms a sealing ring between the battery container (which acts as one electrical contact for the battery) and a contact spring that is placed within the mounting cage before the electrode set and acts as the other electrical contact. The retaining arms and projections hold the components of the electrode set accurately in place during battery assembly. The retaining arms define openings in the side of the mounting cage that allow the separator to be impregnated with electrolyte. The openings also define volumes between the electrode set and the battery container for lateral expansion and gas exchange. Using the mounting cage of the present invention simplifies battery production by allowing the electrode sets to be assembled before being sealed within a battery container.

33 Claims, 1 Drawing Sheet

BATTERY HAVING AN ELECTRODE MOUNTING CAGE AND METHOD FOR ITS MANUFACTURE

BACKGROUND OF THE INVENTION

1. Field of the Invention

The present invention relates to batteries, and, in particular, to alkaline rechargeable batteries.

2. Description of the Related Art

German Patent 1596306 discloses a rechargeable battery in which the electrodes are held by two insulating rings that engage over one another. The proposed connection of the insulating rings by means of a screw connection or bayonet fitting, the proposed electrical leads, and the number of parts used do not allow economic, automated production.

SUMMARY OF THE INVENTION

The present invention is directed to a battery having a non-conductive mounting cage that is used as an assembly aid to simplify the manufacturing of such batteries. According to one embodiment of the present invention, an alkaline rechargeable battery has electrodes in the form of tablets and a separator arranged between them. The battery is manufactured by inserting the electrodes and the separator into an electrically non-conductive mounting cage, which has one or more openings on its side. With the electrodes and separator inserted, the mounting cage is then mounted within a battery container having a lower part in the form of a cup and an upper part in the form of a lid. In a preferred embodiment, the non-conductive mounting cage forms the sealing ring for the battery assembly. Before the container is sealed, for example, by swaging or crimping, electrolyte is added and/or the electrodes are subjected to decarbonization. The one or more openings in the side of the mounting cage allows the separator to be saturated with the electrolyte. By using the mounting cage, the manufacture of batteries is simplified with the positive and negative electrodes being assembled without risk of shunt paths.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

Figure 1:
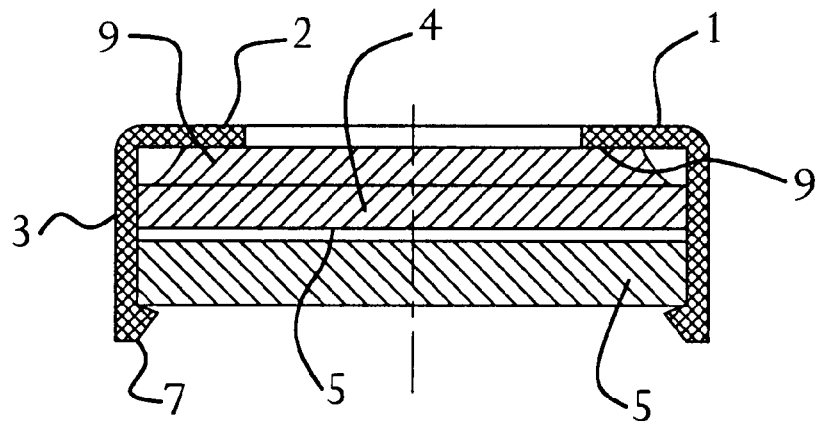
FIG. 1 is a cross section of a mounting cage assembled with an electrode set, according to one embodiment of the present invention.
Figure 2:
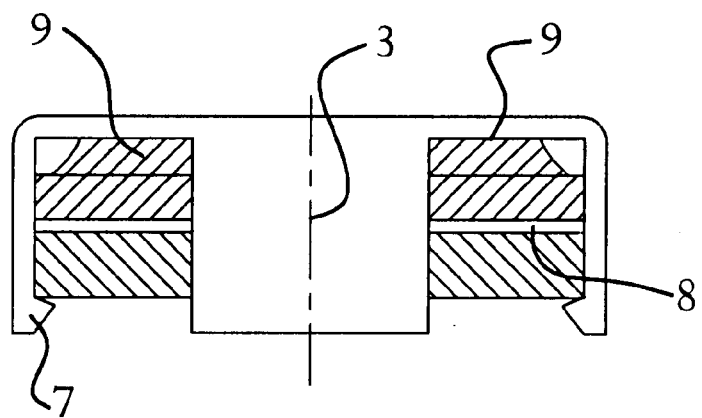
FIG. 2 is a side view of the mounting cage/electrode set assembly of FIG. 1.

FIG. 1 shows a cross section of a mounting cage 1 assembled with an electrode set, according to one embodiment of the present invention. FIG. 2 shows a side view of the mounting cage/electrode set assembly of FIG. 1.

The electrode set comprises a separator 6 placed between a negative electrode 4 and a positive electrode 5. The electrodes can be packaged in nickel wire mesh or can be embedded in nickel foam.

The mounting cage 1 is made of an electrically non-conductive material, for example, an insulating plastic such as polyethylene, polypropylene, polyvinylchloride, polytetraflouroethylene, or a similar material, by injection molding. The mounting cage 1 has a ring 2 from which a number of retaining arms 3 extend over the thickness of the electrode set. These retaining arms 3 define one or more openings on the side of the mounting cage 1. At the end of each retaining arm 3 is a projection 7 pointing inward. As shown in FIG. 2, the retaining arms 3 are interconnected by ring-like connections 8 which increase the robustness of the mounting cage 1.

A contact spring 9 is placed within the mounting cage 1 between the ring 2 and the electrode set. The contact spring 9, which acts as one of the electrical contacts of the assembled battery, provides volume equalization and ensures contact both between the battery components and within the battery.

According to the present invention, a battery is assembled by first assembling the electrode set into the mounting cage 1 (e.g., inserting the contact spring 9, followed by the negative electrode 4, followed by the separator 6, followed by the positive electrode 5) and then sealing the mounting cage/electrode set assembly within a battery container. The battery container (not shown) has a cup-like 20 lower part and a lid-like upper part. The mounting cage 1 electrode set assembly is placed within the cup-like lower part and the lid-like upper part is sealed over the cup-like lower part by swaging or crimping together the edges of the upper and lower parts. Before the mounting cage/electrode set assembly is sealed within the battery container, the electrode set can be subjected to decarbonization and/or impregnated with electrolyte to ensure distortion-free, uniform wetting of the separator. In this way, the addition of electrolyte into the cup-like lower part of the battery container can be restricted or even completely avoided.

The mounting ring 1 with its various parts provide different functions. The retaining arms 3 and projections 7 hold the electrode set components accurately in position within the mounting cage 1 during the assembly process. In particular, the retaining arms 7 are used during insertion of the separator 6 as lateral centering aids, by which means the separator 6 is centered without any significant offset or distortion. The one or more openings in the side of the mounting cage 1 allow the electrolyte to reach the separator 6. The openings also define volumes between the electrode set and the battery container which function as lateral expansion spaces as well as the gas exchange areas required for the gas produced in the event of overcharging reactions. By designing the connections 8 to be located in the region of the separator 6, protection against shunt paths is improved. The ring 2 acts as a sealing ring for the assembled battery, electrically isolating the contact spring 9 from the battery container, which acts as the other electrical contact for the assembled battery.

Using the mounting cage 1 of the present invention simplifies battery production in that the electrodes and the separator are combined to form an electrode set, which can be stored in magazines and allows automated production.

In an alternative embodiment of the present invention, the mounting cage has the shape of a truncated cone, with the ring forming the termination on the smaller circular surface of the truncated cone.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A battery comprising:
   (a) an electrode set comprising a separator between positive and negative electrodes;
   (b) an electrically non-conductive mounting cage, having a ring with one or more retaining arms extending over a thickness of the electrode set in which the retaining arms define one or more openings on a side of the mounting cage and hold the electrode set, receiving the electrode set for reducing the risk of shunt paths between the positive and negative electrodes; and
   (c) a battery container, comprising a lower part having a cup shape and a lower edge and an upper part having a lid shape and an upper edge, wherein the lower part is sealingly engaged with the upper part, which houses the mounting cage/electrode set assembly,
   in which one electrode of the electrode set is in conductive contact with the upper part.

2. The battery of claim 1, wherein the battery is an alkaline rechargeable battery.

3. The battery of claim 1, further comprising a contact spring placed within the mounting cage to form one electrical contact for the battery, wherein the spring is in conductive contact with the upper part of the battery container, wherein the mounting cage electrically isolates the contact spring from the lower part of the battery container.

4. The battery of claim 3, wherein the contact spring maintains contact between the mounting cage and the electrode set and provides volume equalization within the battery.

5. The battery of claim 1, wherein the lower edge of the lower part is sealingly crimped with the upper edge of the upper part to seal the battery container wherein the upper part is electrically isolated from the lower part.

6. The battery of claim 1, wherein the mounting cage has one or more openings, wherein each opening is a space having a volume between the electrode set and the battery container, allowing for lateral expansion, enabling electrolyte to reach the separator and for exchanging gases produced from overcharge reactions.

7. The battery of claim 1, wherein each retaining arm has a projection at one end pointing inward to hold the electrode set within the mounting cage during assembly of the battery.

8. The battery of claim 7, wherein the retaining arms are connected to one another by curved-rib connections distinct from the ring.

9. The battery of claim 8, wherein the curved-rib connections are positioned adjacent the separator.

10. The battery of claim 7, wherein the mounting cage has the shape of a truncated cone, with the ring forming the termination on the smaller circular surface of the truncated cone.

11. The battery of claim 1, wherein:
    the battery is an alkaline rechargeable battery;
    the battery further comprises a contact spring placed within the mounting cage in electrical contact with the negative electrode and the upper part of the battery container, wherein the contact spring maintains contact between the mounting cage and the negative electrode of the electrode set and provides volume equalization within the battery; and
    the mounting cage has a ring from which extend one or more retaining arms having a projection at one end pointing inward to hold the electrode set within the mounting cage during assembly of the battery, wherein;
    the ring acts as a sealing ring between the contact spring and the battery container;
    and the retaining arms are connected to one another by curved-rib connections distinct from the ring and positioned adjacent to the separator; and
    the retaining arms define one or more openings wherein each opening is a space having a volume between the electrode set and the battery container, allowing for lateral expansion, enabling electrolyte to reach the separator and for exchanging gases produced from overcharge reactions.

12. The battery of claim 11, wherein the lower edge of the lower part is sealingly crimped with the upper edge of the upper part to seal the battery container wherein the upper part is electrically isolated from the lower part.

13. The battery of claim 11, wherein the lower edge of the lower part is sealingly swaged with the upper edge of the upper part to seal the battery container wherein the upper part is electrically isolated from the lower part.

14. The battery of claim 1, wherein the lower edge of the lower part is sealingly swaged with the upper edge of the upper part to seal the battery container wherein the upper part is electrically isolated from the lower part.

15. The battery of claim 1, wherein the electrodes are embedded in nickel foam.

16. The battery of claim 1, wherein the electrodes are in pressed tablet form encapsulated in a nickel wire mesh.

17. A method of manufacturing a battery, comprising the steps of:
    (a) inserting an electrode set, comprising a separator between a positive electrode and a negative electrode, into an electrically non-conductive mounting cage, wherein the mounting cage has a ring with one or more retaining arms extending over the thickness of the electrode set wherein the retaining arms have projections at one end pointing inward to hold the electrode set within the mounting cage during assembly of the battery; and
    (b) sealing the mounting cage/electrode set assembly within a battery container, comprising a cup-shaped lower part and a lid-shaped upper part.

18. The method of claim 17, wherein a contact spring is inserted into the mounting cage before the electrode set, wherein the contact spring forms one electrical contact for the battery, with the battery container forming another electrical contact for the battery.

19. The battery of claim 18, wherein part of the mounting cage acts as a sealing ring between the contact spring and the battery container.

20. The method of claim 18, wherein the contact spring maintains contact between the mounting cage and the electrode set and provides volume equalization within the battery.

21. The method of claim 17, wherein the mounting cage has one or more openings on its side to enable electrolyte to reach the separator and to define one or more volumes between the electrode set and the battery container for lateral expansion and gas exchange.

22. The method of claim 17, wherein the negative electrode is inserted into the mounting cage, followed by the separator, followed by the positive electrode.

23. The method of claim 12, wherein the retaining arms are connected to one another by one or more curved-rib connections distinct from the ring.

24. The method of claim 23, wherein the curved-rib connections are positioned adjacent to the separator to inhibit shunt paths between the electrodes.

25. The method of claim 12, wherein the mounting cage has the shape of a truncated cone, with the ring forming the termination on the smaller circular surface of the truncated cone.

26. The method of claim 17, wherein:

the battery is an alkaline rechargeable battery;

the battery further comprises a contact spring placed within the mounting cage to form one electrical contact for the battery, with the battery container forming another electrical contact for the battery, wherein the contact spring maintains contact between the mounting cage and the electrode set and provides volume equalization within the battery; and wherein:

the ring acts as a sealing ring between the contact spring and the battery container; and the retaining arms are connected to one another by curved-rib connections distinct from the ring and positioned adjacent to the separator to inhibit shunt paths between the electrodes; and the retaining arms define one or more openings on its side to enable electrolyte to reach the separator and to define one or more volumes between the electrode set and the battery container for lateral expansion and gas exchange.

27. The method of claim 17, wherein the battery is an alkaline rechargeable battery.

28. The method of claim 17, wherein the electrode set is impregnated with electrolyte before step (b).

29. The method of claim 17, wherein the electrodes are subjected to decarbonization before step (b).

30. The method of claim 17, wherein the upper part is sealed onto the lower part by swaging or crimping.

31. An electrode set comprising a separator, between a positive and a negative electrode, and an electrically non-conductive, unitary mounting cage for receiving the electrode set, which reduces the risk of shunt paths between the positive and negative electrodes, wherein the mounting cage comprises a ring, retaining arms, interconnected by curved-rib connections extending from the ring, and projections pointing inward for holding the electrodes.

32. The electrode set of claim 31, wherein the set further comprises a contact spring in electrical contact with an electrode.

33. The electrode set of claim 32, wherein the electrodes are securely mounted in the mounting cage by retaining arms, interconnected by the curved-rib connectors, and projections pointing inward.

* * * * *